United States Patent Office 3,551,796
Patented Dec. 29, 1970

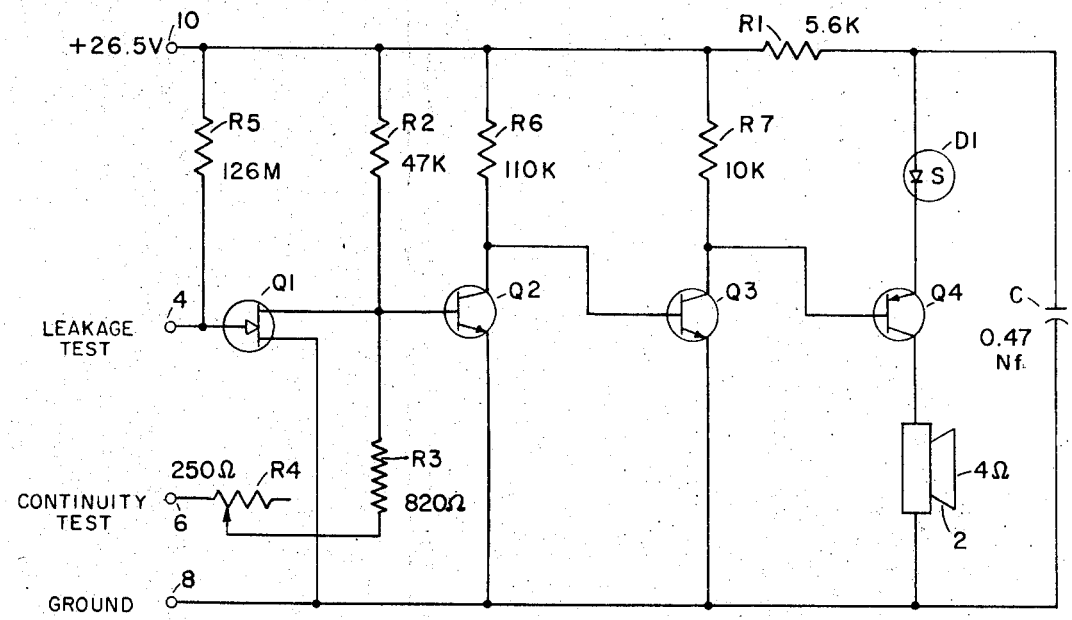

3,551,796
AUDIO OUTPUT DEVICE FOR TESTING LEAKAGE AND CONTINUITY OF A CIRCUIT
James D. Holder, Huntsville, and Hugh W. Greene, Somerville, Ala., assignors to the United States of America as represented by the Secretary of the Army
Filed Jan. 3, 1969, Ser. No. 788,813
Int. Cl. G01r 31/02
U.S. Cl. 324—51                              2 Claims

ABSTRACT OF THE DISCLOSURE

An audible output device for testing the continuity and leakage of very sensitive circuits. Continuity in the item under test allows a bias to be applied to a transistor. A relaxation type oscillator connected to a speaker is energized in response to conduction in the transistor. Leakage resistance below a certain predetermined level causes a junction field-effect transistor to ultimately energize the relaxation type oscillator.

BACKGROUND OF THE INVENTION

It has long been known that the use of an ohmmeter to test the continuity and leakage in a circuit containing semi-conductor devices may cause damage to these devices because of excessive voltage or current. In addition, the ohmmeter is inherently a visual display which, in an extensive series of tests, is often inconvenient to observe. There is, therefore, a need for a device which operates on very low voltage and current to check the continuity and leakage of a circuit. Such a device would also be of great value in checking the continuity of bridgewires on very sensitive electro-explosive devices.

SUMMARY OF THE INVENTION

In the present invention it is desired to provide an audible output to indicate continuity of the circuit or leakage of the circuit below a certain predetermined resistance level. A relaxation type oscillator connected to a speakers is cut on to give the desired audible output. If the circuit being tested has continuity, a bias voltage will be applied to the base of a transistor. The transistor will ultimately cause the relaxation oscillator to be energized. A junction field effect transistor is so connected that a leakage resistance below a certain predetermined level will cause the field effect transistor to bias another transistor to ultimately energize the relaxation oscillator.

DESCRIPTION OF THE DRAWING

The single figure drawing is a schematic diagram of the present invention.

DESCRIPTION OF THE PREFERRED EMBODIMENTS

Referring to the drawing, resistor R1 and capacitor C1 comprise an R-C time constant relaxation type oscillator using Shockley diode D1 as the discharge element and loud-speaker 2 as the output device. Transistor Q4 is connected in series with the speaker and serves as a switch to complete the circuit to the speaker when certain inputs exist between input terminals 4 or 6 and 8 (ground). Transistor Q2 is normally conducting. Transistors Q3 and Q4 are normally not conducting. With nothing connected to terminals 4 or 6 the voltage applied at terminal 10 biases transistor Q2 through resistor R2. Fixed resistor R3 and variable resistor R4, connected in series from the continuity test input 6 to the base of Q2, provide a means for adjusting the bias applied to the base of transistor Q2 during the continuity test and thus the state of Q2. The indication level, or the level of resistance between terminals 6 and 8 which will not cause Q2 to cut off, may be varied by varying resistor R4. This means that Q2 will cut off and thus indicate continuity for any circuit connected between terminals 6 and 8 if the circuit's resistance is below a certain level. This level is determined by resistors R2, R3, and R4, R4 being a variable resistor and serving as the controlling factor in determining the indicator level of the continuity circuit test.

The source terminal of junction field effect transistor Q1 is connected to the base of transistor Q2 and the draining terminal of transistor Q1 is connected to ground. The gate terminal of Q1 is connected to terminal 4 and serves as the input point for the leakage test. Transistor Q1 presents a very high input impedance. Current for the leakage test is provided through resistor R5. Resistors R6 and R7 are biasing resistors for transistors Q2 and Q3.

In operation: terminals 6 and 8 are connected to a unit under test to check the continuity of the unit. If continuity exists between terminals 6 and 8, transistor Q2 will be cut-off, transistor Q3 cut-on, transistor Q4 cut-on, and an audible output produced by speaker 2. If continuity does not exist between terminals 6 and 8, there will be no audible output. To check the leakage of unit under test, terminals 4 and 8 are connected to the test unit. If the leakage resistance is below a certain predetermined level, Q1 will so bias Q2 as to turn Q2 off. The same action will occur as in the continuity test to provide an audible output from speaker 2. In the continuity test, no audible output means that the circuit resistance is above the predetermined indication level.

Using the values assigned to the circuit components as indicated in the drawing, an idle current of about 0.5 milliamps exist. The leakage test provides a maximum initial voltage of 26.5 volts. With a 10 megohm test resistance, the test voltage is 1.93 volts and the sense current is 0.2 microamps. In the continuity test, the maximum voltage is 0.53 volts and the sense current is 510 microamps maximum.

It will be apparent to those skilled in the art that changes may be made in the form of the apparatus disclosed without departing from the spirit of the invention as set forth in the appended claims. For example, this invention can indicate as continuous an external resistance of 13 ohms and as open 15 ohms by adjusting the indication level as previously discussed. This invention could be used to range or indicate the value of resistors as being above or below the set indication level. Capability to test for far higher resistances can be obtained by the use of an insulated-gate field-effect device. The loud-speaker, and indeed the entire audio oscillator, could be replaced with any of several different types of electrical-to-audio-conversion devices, such as a sensitive relay or solid state switch which activates a buzzer, bell or similar device.

We claim:
1. A continuity and leakage circuit tester comprising a first transistor having a base, emitter, and collector; indicator means; first, second, third and fourth input terminals; said first input terminal being energized with a low voltage and said third input terminal being at ground potential; a variable resistor connected between said base of said first transistor and said second terminal; a first resistor connected between said base and said first terminal; said emitter being connected to said third terminal; said collector being connected to said indicator means and resistively connected to said first terminal; a field effect transistor having a gate terminal, a source terminal, and a drain terminal; said source terminal being connected to said base, said drain terminal being connected to said third terminal, and said gate terminal being connected to said fourth terminal; and a second resistor being connected between said gate terminal and said first input terminal said second, third and fourth input terminals adapted to be connected to the circuit to be tested.

2. A continuity and leakage circuit tester as set forth in claim 1 wherein said indicator means comprises a second and third transistor having a base, emitter, and collector; a diode having an anode and cathode; a third resistor connected between said anode and said first terminal; said collector of said second transistor being connected to said base of said third transistor and resistively connected to said first terminal; a speaker having a first side connected to the collector of said third transistor and a second side connected to said third terminal; a capacitor connected between said second side of said speaker and said anode of said diode; said cathode of said diode being connected to said emitter of said third transistor; said emitter of said second transistor being connected to said third terminal; said collector of said first transistor being connected to said base of said second transistor.

References Cited

UNITED STATES PATENTS

| | | | |
|---|---|---|---|
| 2,916,697 | 12/1959 | Boode | 324—54 |
| 2,977,531 | 3/1961 | Humes et al. | 324—54 |
| 3,277,364 | 10/1966 | Abrahamson | 324—54 |
| 3,284,707 | 11/1966 | Clinton | 324—51X |

GERARD R. STRECKER, Primary Examiner

U.S. Cl. X.R.

324—62